US012621610B2

(12) United States Patent
Rao et al.

(10) Patent No.: US 12,621,610 B2
(45) Date of Patent: May 5, 2026

(54) ELECTRONIC DEVICE

(71) Applicant: MERRY ELECTRONICS (SUZHOU) CO., LTD., Jiangsu Province (CN)

(72) Inventors: Liguo Rao, Jiangsu Province (CN); YuanYuan Zhang, Jiangsu Province (CN)

(73) Assignee: MERRY ELECTRONICS (SUZHOU) CO., LTD., Jiangsu Province (CN)

( * ) Notice: Subject to any disclaimer, the term of this patent is extended or adjusted under 35 U.S.C. 154(b) by 97 days.

(21) Appl. No.: 18/642,117

(22) Filed: Apr. 22, 2024

(65) Prior Publication Data

US 2025/0063309 A1 Feb. 20, 2025

(30) Foreign Application Priority Data

Aug. 18, 2023 (CN) ......................... 202311047491.0

(51) Int. Cl.
*H04R 9/06* (2006.01)
*H04R 1/02* (2006.01)
(Continued)

(52) U.S. Cl.
CPC ............... *H04R 9/06* (2013.01); *H04R 1/023* (2013.01); *H04R 1/025* (2013.01); *H04R 7/04* (2013.01);
(Continued)

(58) Field of Classification Search
CPC .......... H04R 9/06; H04R 1/023; H04R 1/025; H04R 7/04; H04R 7/18; H04R 9/025; H04R 9/045
(Continued)

(56) References Cited

U.S. PATENT DOCUMENTS

2024/0147158 A1 5/2024 Jin et al.
2024/0147164 A1* 5/2024 Jin ......................... H04R 9/046
(Continued)

FOREIGN PATENT DOCUMENTS

CN 218830621 U 4/2023
WO WO 2022/135125 A1 6/2022
(Continued)

OTHER PUBLICATIONS

U.S. Office Action for U.S. Appl. No. 18/630,617, dated Dec. 31, 2025.
(Continued)

*Primary Examiner* — Sean H Nguyen
(74) *Attorney, Agent, or Firm* — Birch, Stewart, Kolasch & Birch, LLP

(57) ABSTRACT

An electronic device includes a housing, a first and a second magnetic modules, a counterweight base, a motor coil, a supporting plate, a bracket module, a vibration module and a voice coil. The housing has an accommodation groove. The first magnetic module is disposed in the accommodation groove. The counterweight base is disposed on the first magnetic module. The motor coil is disposed on the counterweight base and is correspondingly disposed above the first magnetic module. The second magnetic module corresponds to the motor coil. The bracket module is located on the second magnetic module and divides the accommodation groove into a first and a second audio cavities. The second magnetic module is disposed in the first audio cavity. The vibration module is disposed on the bracket module. The voice coil is disposed under the vibration module, passes through the bracket module and is located inside the second magnetic module.

15 Claims, 9 Drawing Sheets

(51) Int. Cl.
*H04R 7/04* (2006.01)
*H04R 7/18* (2006.01)
*H04R 9/02* (2006.01)
*H04R 9/04* (2006.01)

(52) U.S. Cl.
CPC ............... *H04R 7/18* (2013.01); *H04R 9/025* (2013.01); *H04R 9/045* (2013.01)

(58) Field of Classification Search
USPC .......................................................... 381/335
See application file for complete search history.

(56) References Cited

U.S. PATENT DOCUMENTS

| | | | |
|---|---|---|---|
| 2025/0063307 | A1 | 2/2025 | Rao et al. |
| 2025/0063308 | A1 | 2/2025 | Rao et al. |

FOREIGN PATENT DOCUMENTS

| | | | | | |
|---|---|---|---|---|---|
| WO | WO-2024087295 | A1 * | 5/2024 | ............... | H04R 9/06 |
| WO | WO-2024130789 | A1 * | 6/2024 | ............... | H04R 9/02 |

OTHER PUBLICATIONS

U.S. Office Action for U.S. Appl. No. 18/642,211, dated Nov. 14, 2025.

* cited by examiner

ELECTRONIC DEVICE

CROSS REFERENCE TO RELATED APPLICATION

This application claims the priority benefit of Chinese Patent Application Serial Number 2023110474910, filed on Aug. 18, 2023, the full disclosure of which is incorporated herein by reference.

BACKGROUND

Technical Field

The present application is related to a technical field of handheld or wearable electronic devices, and particularly is related to an electronic device combining structures of a speaker and a motor.

Related Art

Currently, in internal components used in smartphones and smartwatches on a market, a speaker structure for audio playback and a motor structure for providing linear vibration are both independently designed. First, the speaker structure and the motor structure are processed and manufactured as individual components separately. Subsequently, the speaker structure and the motor structure are mounted inside an electronic device by reasonable configuration. However, the drawbacks of the aforementioned speaker structure and the aforementioned motor structure manufactured by the independent design is to have difficulty in how to utilize the reasonable configuration to effectively reduce the needed inner space of the electronic device occupied by the speaker structure and the motor structure, and it results in the limitation on the structural configuration of the inner space of the electronic device, thereby squeezing the space of the other components. As a result, how to effectively enhance the overall performance of the electronic device is the challenge.

SUMMARY

The embodiments of the present application provide an electronic device that addresses the issue of the needed inner space of the electronic device occupied by the speaker structure and motor structure, which currently restricts the structural configuration of the inner space within electronic devices.

To solve the aforementioned issue, the present application is accomplished by the following steps.

An electronic device including a housing, a first magnetic module, a counterweight base, a motor coil, a supporting plate, a second magnetic module, a bracket module, a vibration module and a voice coil is provided. The housing has an accommodation groove. The first magnetic module is disposed in the accommodation groove. The motor coil is disposed on the counterweight base and disposed correspondingly to the first magnetic module, and the first magnetic module is configured to interact with the motor coil. The supporting plate is disposed on the motor coil. The second magnetic module is disposed on the supporting plate, the second magnetic module is disposed correspondingly to the motor coil, and the second magnetic module is configured to interact with the motor coil. The bracket module is disposed in the housing and on the second magnetic module. The bracket module divides the accommodation groove into a first audio cavity and a second audio cavity. The second magnetic module is disposed in the first audio cavity. The vibration module is disposed on the bracket module. The voice coil is disposed under the vibration module, passes through the bracket module and is located inside the second magnetic module.

In one embodiment, two elastic modules disposed on two sides of the counterweight base respectively are further included, wherein two ends of each of the elastic modules contact the housing and the counterweight base respectively.

In one embodiment, the counterweight base further includes a first groove disposed on the bottom of the counterweight base and a second groove disposed on the top of the counterweight base, the first magnetic module is disposed in the first groove, and the motor coil is disposed in the second groove.

In one embodiment, the second magnetic module further includes a major magnetic component and a plurality of minor magnetic component disposed outside the major magnetic component, the major magnetic component corresponds to one side above the motor coil, and the minor magnetic component correspond to the other side above the motor coil.

In one embodiment, the first magnetic module includes a first magnetic component and a second magnetic component, the first magnetic component corresponds to one side below the motor coil, and the second magnetic component corresponds to the other side below the motor coil.

In one embodiment, the bracket module has a bracket component and a minor magnetic conductive component where the bracket component is disposed, the materials of the bracket component includes plastics materials and the bracket component has an inner part and an opening, the minor magnetic conductive component has a plurality of fixing holes, the bracket component is fixed on the minor magnetic conductive component by plastic injection molding, the inner part of the bracket component passes through the plurality of fixing holes of the minor magnetic conductive component, the bracket component has an opening corresponding to the major magnetic component, the minor magnetic components is disposed outside the opening, the bracket component is fixed on the minor magnetic component, the voice coil passes through the opening and is disposed between the major magnetic component and the plurality of minor magnetic components, and the opening is connected between the first audio cavity and the second audio cavity.

In one embodiment, the bracket component of the bracket module has an audio outlet connected to a space having the voice coil inside the accommodation groove.

In one embodiment, a dust-proof cover disposed on the audio outlet of the bracket module is further included.

In one embodiment, the inner side of the minor magnetic conductive component has a magnetic conductive part fixed on the corresponding minor magnetic component and the outer side of the minor magnetic conductive component has a first clamping part, the housing has a second clamping part disposed on the peripheral side of the accommodation groove, and the first clamping part is fixed with the second clamping part.

In one embodiment, the bracket module has a vent disposed around the opening and connected to the opening, and the vent is connected to the first audio cavity and the second audio cavity.

In one embodiment, a major magnetic conductive component disposed on the major magnetic component is further included.

In one embodiment, a magnetic conductive plate disposed on the counterweight base is further included, and the magnetic conductive plate is disposed under the supporting plate and located at one side of the motor coil.

In one embodiment, the counterweight base further includes a third groove disposed on the top of the counterweight base and the third groove is located on one side of the motor coil, and the magnetic conductive component is located in the third groove.

In one embodiment, the supporting plate has a major body part and a plurality of connecting parts disposed on the peripheral side of the major body part, and the plurality of connecting parts are fixed on an inner wall of the housing respectively.

In one embodiment, the vibration module includes a diaphragm and a middle adhesive sheet, the bracket module is disposed on the peripheral side of the diaphragm, and the diaphragm is disposed on the peripheral side of the middle adhesive sheet, the voice coil is disposed under the middle adhesive sheet and is located inside the diaphragm.

In one embodiment, an electrical module disposed on the counterweight base is further included, wherein one end of the electrical module is electrically connected to the motor coil, and the other end of the electrical module extends from the accommodation groove to the outside of the housing.

The present application provides an electronic device that employs the structural design in which the voice coil and the motor coil share the second magnetic module to effectively reduce the needed inner space of the electronic device occupied by the combination of the speaker structure and motor structure, thereby increasing the available space of the other components. The available space may be used to enhance the design of the structures of the other components to improve the efficiency of the electronic device. Alternatively, the available space may directly reduce the overall volume of the electronic device, and it is more convenient for storage.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The accompanying drawings herein is provided to have a further understanding on the present application and constitutes a part of the present application. The schematic embodiments and the description of the present application is used to explain the present application instead of constituting inappropriate limitation. In the drawings.

Figure 1:
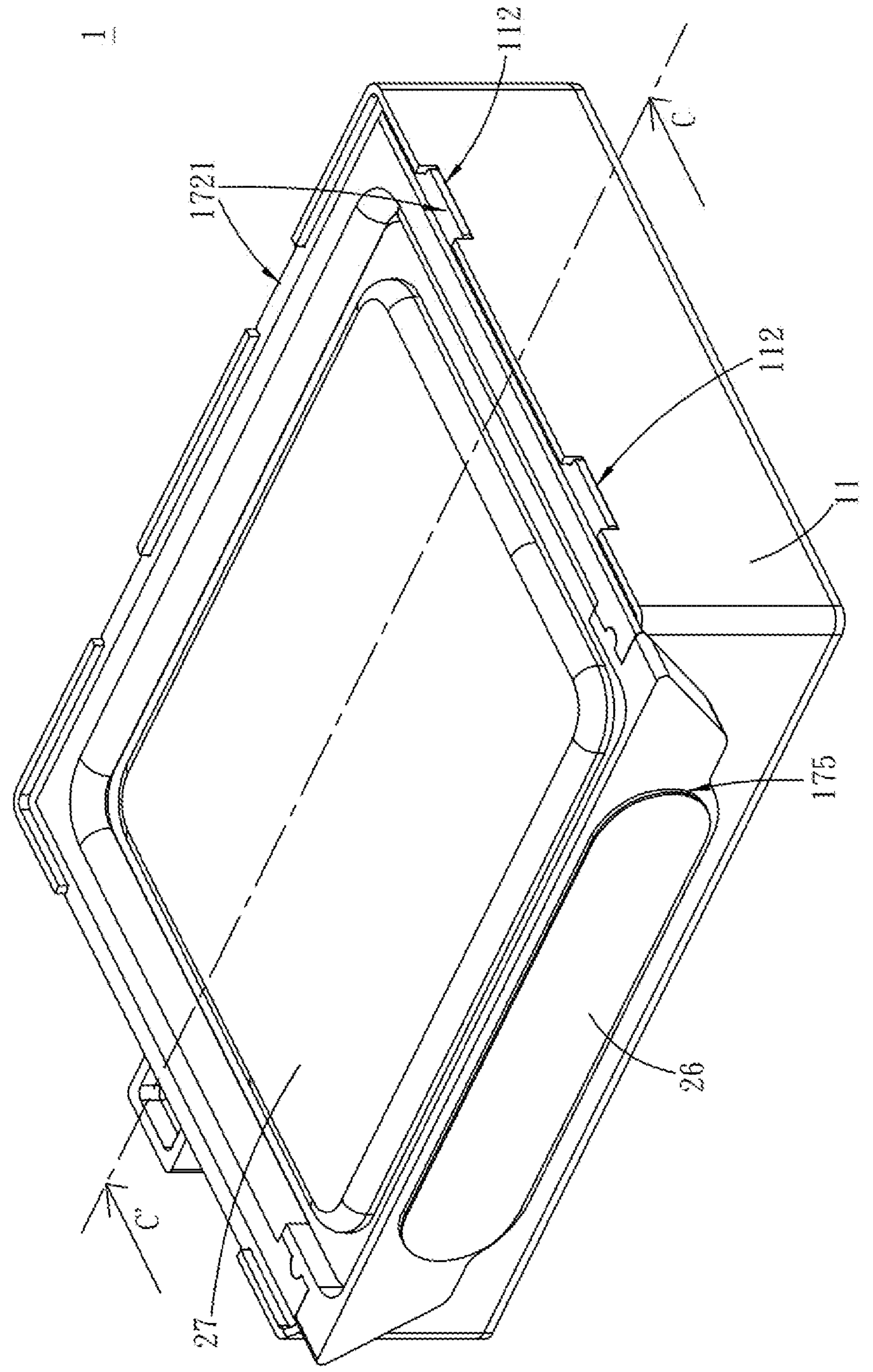
FIG. 1 is a 3D view of the electronic device of the present application.

Considering the accompanying diagrams, the explanations are as follows: 1: electronic device; 11: housing; 111: accommodation groove; 1111: first audio cavity; 1112: second audio cavity; 112: second clamping part; 113: audio hole; 12: first magnetic module; 121: first magnetic component; 122: second magnetic component; 13: counterweight base; 14: motor coil; 15: supporting plate; 16: second magnetic module; 161: major magnetic component; 162: minor magnetic component; 17: bracket module; 171: bracket component; 172: minor magnetic conductive component; 1720: fixing hole; 1721: first clamping part; 1722: magnetic conductive part; 173: opening; 174: vent; 175: audio outlet; 18: vibration module; 181: diaphragm; 182: middle adhesive sheet; 19: voice coil; 20: conductive component; 21: elastic module; 22: electrical module; 23: magnetic conductive plate; 24: major magnetic conductive component; 26: dust-proof cover; 27: cover plate; 28: external speaker; A: first magnetic pole; B: second magnetic pole.

DETAILED DESCRIPTION OF THE EMBODIMENTS

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms “include/including” and “comprise/comprising” are used in an open-ended fashion, and thus should be interpreted as “including but not limited to”. “Substantial/substantially” means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms “include”, “contain”, and any variation thereof are intended to cover a non-exclusive inclusion. Therefore, a process, method, object, or device that comprises a series of elements not only include these elements, but also comprises other elements not specified expressly, or may include inherent elements of the process, method, object, or device. If no more limitations are made, an element limited by “include a/an . . . ” does not exclude other same elements existing in the process, the method, the article, or the device which comprises the element.

In the following embodiment, the same reference numerals are used to refer to the same or similar elements throughout the invention.

Figure 2:
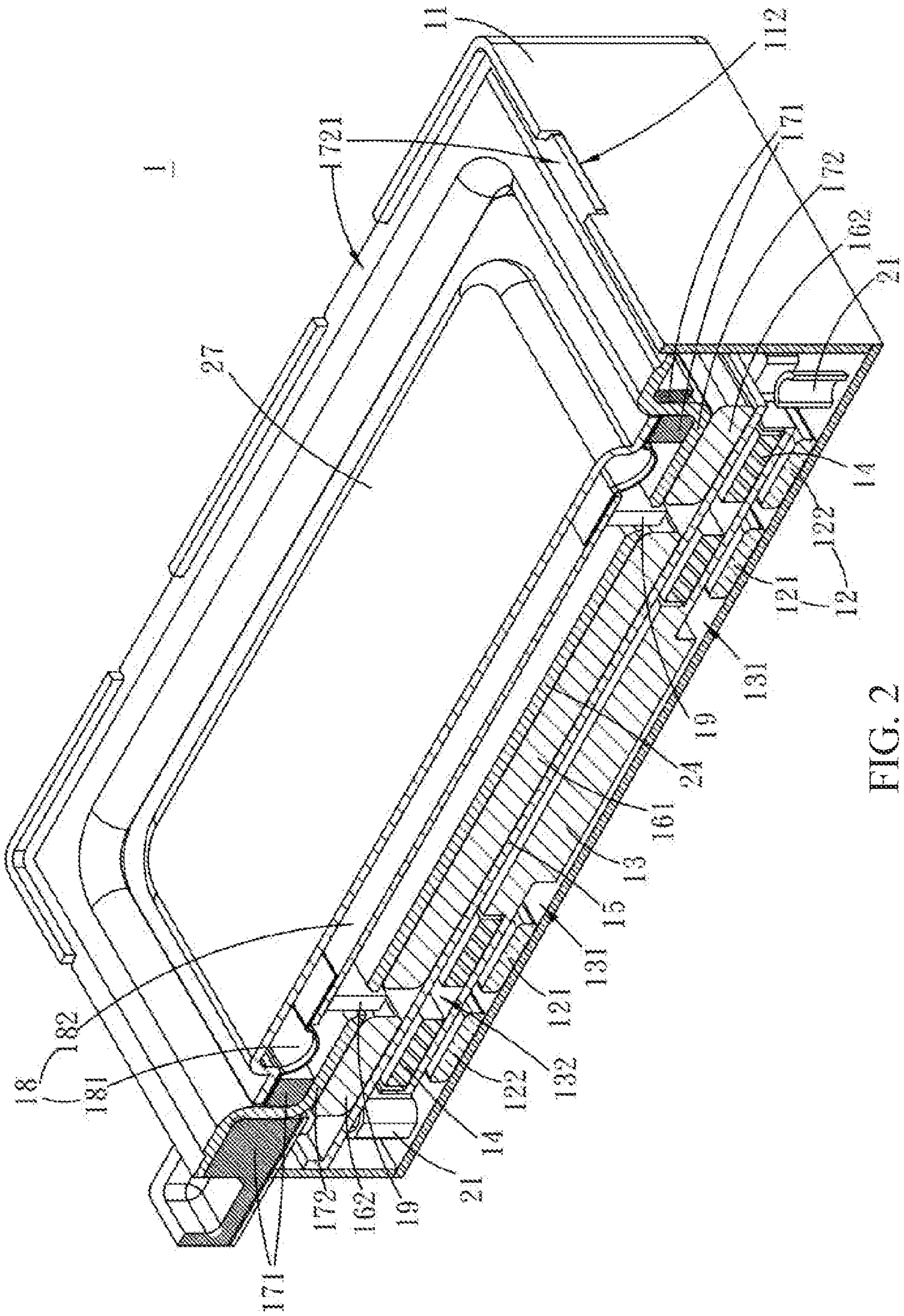
FIG. 2 is a 3D cross-sectional view of FIG. 1 along line C-C'.
Figure 3:
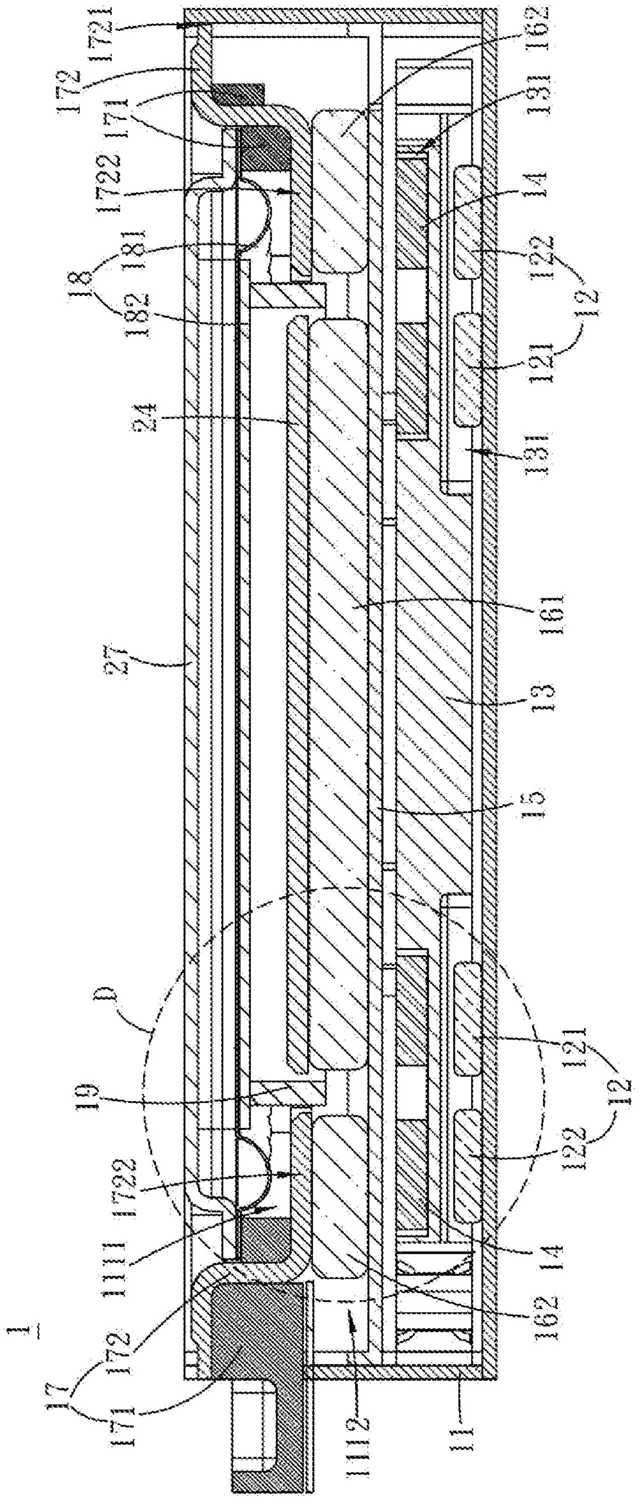
FIG. 3 is a sectional view sectioned from line C-C' of FIG. 1.
Figure 4:
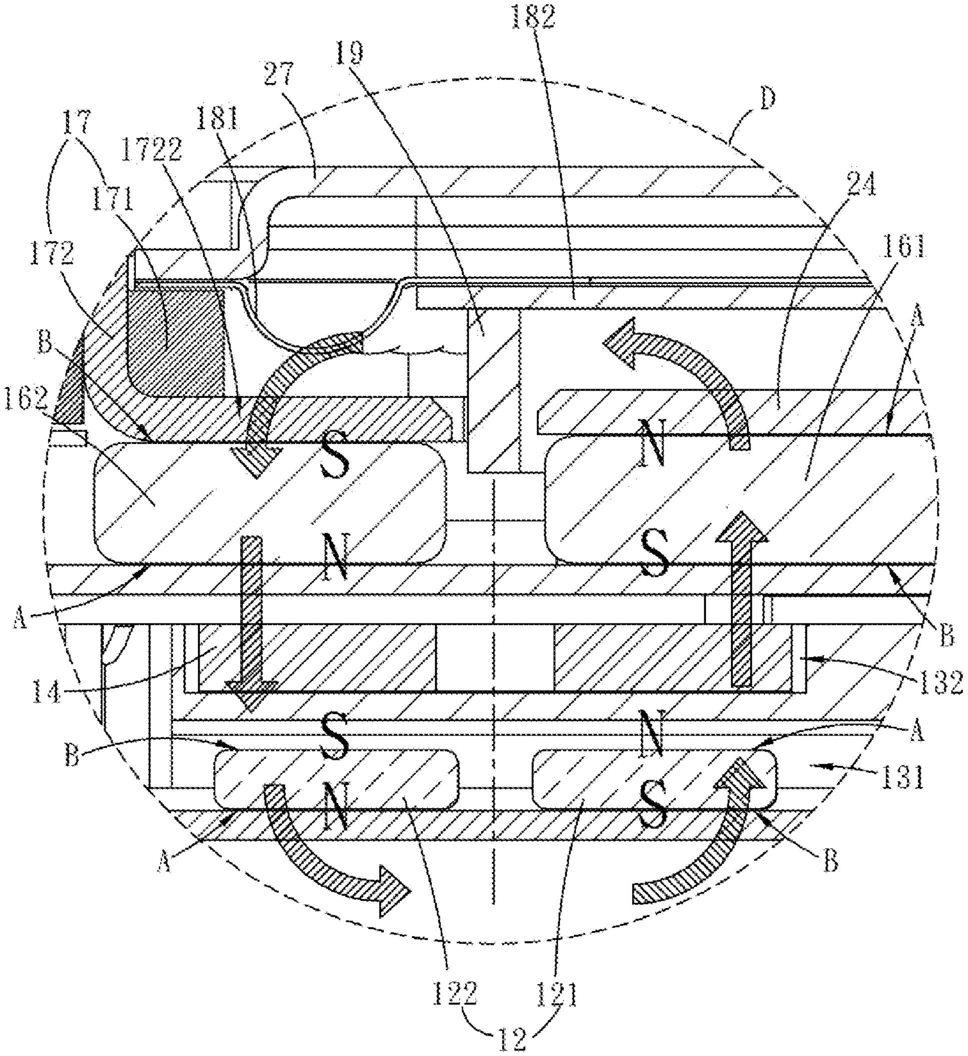
FIG. 4 is an enlarged view of region D in FIG. 3.

Please refer to FIGS. 1 to 4. FIG. 1 is a 3D view of the electronic device of the present application, FIG. 2 is a 3D cross-sectional view of FIG. 1 along line C-C', FIG. 3 is a sectional view sectioned from line C-C' of FIG. 1, and FIG. 4 is an enlarged view of the region D in FIG. 3. As shown in the figures, the present application provides an electronic device 1 including a housing 11, a first magnetic module 12, a counterweight base 13, a motor coil 14, a supporting plate 15, a second magnetic module 16, a bracket module 17, a vibration module 18, and a voice coil 19. The housing 11 has an accommodation groove 111. The first magnetic module 12 is disposed in the accommodation groove 111. The counterweight base 13 is disposed on the first magnetic module 12. The motor coil 14 is disposed on the counterweight base 13, and the motor coil 14 is correspondingly disposed to the first magnetic module 12. The first magnetic module 12 is configured to interact with the motor coil 14. The supporting plate 15 is disposed on the motor coil 14. The second magnetic module 16 is disposed on the supporting plate 15, and the second magnetic module 16 is fixed on the supporting plate 15 through adhesive. The second magnetic module 16 is correspondingly disposed to the motor coil 14, and the second magnetic module 16 is configured to interact with the motor coil 14. The bracket module 17 is disposed in the housing 11, and the bracket module 17 is located on the second magnetic module 16. The vibration module 18 is disposed on the bracket module 17, a cover plate 27 is disposed on the bracket module 17, the cover plate 27 covers the vibration module 18, and the voice coil 19 is disposed under the vibration module 18. The voice coil 19 passes through the bracket module 17 and is disposed in the second magnetic module 16. The counterweight base 13 is the center of gravity of the electronic device 1, and in other words, the weight of the counterweight base 13 maybe adjusted according to the user's needs.

Figure 5:
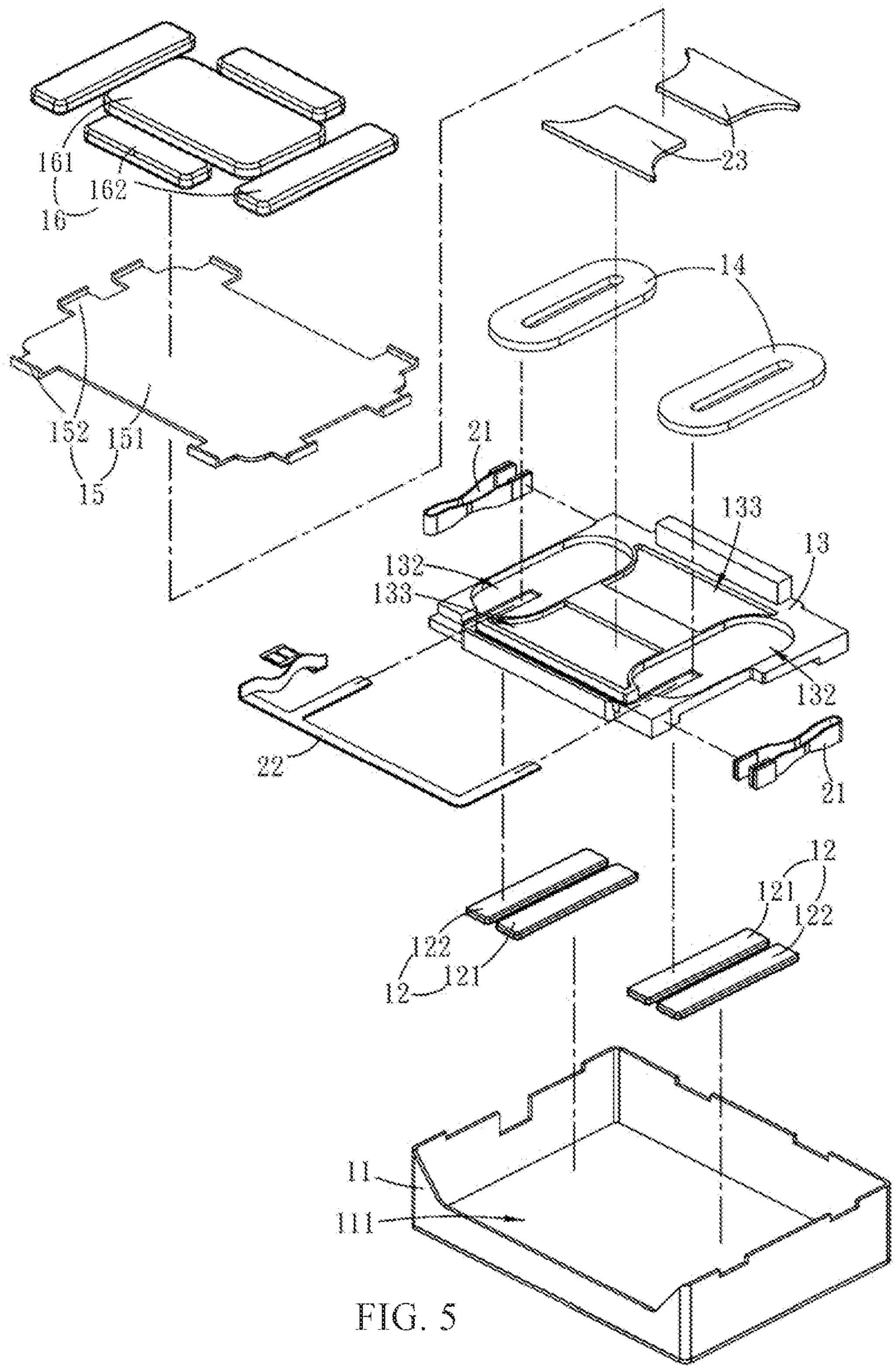
FIG. 5 is an exploded view of the lower part of the electronic device of the present application.
Figure 6:
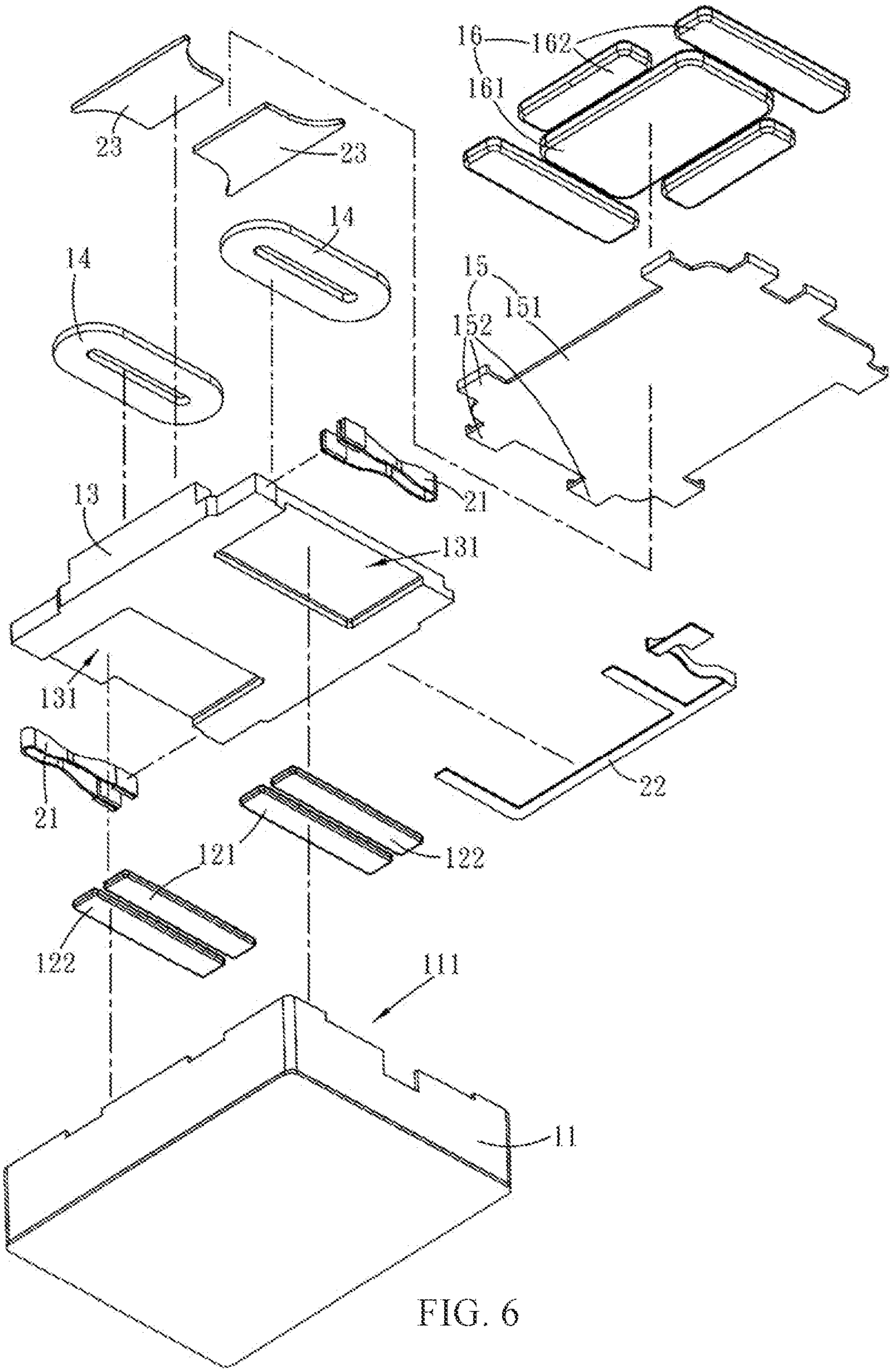
FIG. 6 is an exploded view of another lower part of the electronic device of the present application.

Please refer to FIGS. 5 and 6, FIG. 5 is an exploded view of the lower part of the electronic device of the present application, and FIG. 6 is an exploded view of another lower part. As shown in the figures, in this embodiment, the materials of the housing 11 include metal materials. The materials of the counterweight base 13 include tungsten steel or heavier material, etc. The counterweight base 13 is configured to stabilize the operational state of the electronic device 1, such as vertical vibration or lateral displacement. Furthermore, the electronic device 1 further includes two elastic modules 21 disposed on the two sides of the counterweight base 13 respectively. The two ends of each of the elastic module 21 contact the inner wall of the housing 11 and the counterweight base 13, respectively, so that the counterweight base 13 is maintained in the center of the accommodation groove 111 of the housing 11 due to the mutual withstanding of the two elastic modules 21 on both sides of the counterweight base 13. In this embodiment, the elastic module 21 has a V-shaped or U-shaped bent structure, and the materials of the elastic module 21 includes bendable metal material. When the elastic module 21 on one side of the counterweight base 13 undergoes vibrations and compression and the two ends of the elastic module 21 on one side of the counterweight base 13 approach each other due to the compression, the elastic module 21 on one side of the counterweight base 13 generates a reactive elastic restoring force due to the compression, and thus, the counterweight base 13 is pushed at the center position of the accommodation groove 111. At the same time, the two ends of the elastic module 21 on the other side of the counterweight base 13 undergo a pull force to be separated from each other so that the elastic module 21 on the other side of the counterweight base 13 generates a reactive elastic restoring force due to tension, and thus, the counterweight base 13 is pushed at the center position of the accommodation groove 111 . . . . In this embodiment, in addition to maintaining the center of gravity by the counterweight of the counterweight base 13, the action force of the two elastic modules 21 serves as a buffer for the displacement caused by the vibration of the counterweight base 13.

In this embodiment, there are two first magnetic modules 12, each of which includes a first magnetic component 121 and a second magnetic component 122, and the two surfaces of the first magnetic component 121 and the two surfaces of the second magnetic component 122 all have a first magnetic pole A and a second magnetic pole B. The first magnetic component 121 and the second magnetic component 122 are arranged in parallel, and the magnetic poles of the first magnetic component 121 and the second magnetic component 122 are set as opposite magnetism. In this embodiment, the first magnetic pole A is the N pole, and the second magnetic pole B is the S pole. The magnetic poles of the S pole or N pole maybe adjusted according to user requirements. The two first magnetic modules 12 are disposed on the bottom of the accommodation groove 111 of the housing 11, and the two first magnetic modules 12 are respectively disposed on the two sides of the bottom of the counterweight base 13, and the two first magnetic modules 12 are fixed to the bottom of the accommodation groove 111 through the adhesive. Furthermore, there are two motor coils 14 disposed on the two sides of the top of the counterweight base 13. The two motor coils 14 correspond to the two first magnetic modules 12.

Please refer to FIG. 3 and FIG. 4 again. The two first magnetic modules 12 include the two first magnetic components 121 and the two second magnetic components 122. The two first magnetic components 121 of the two first magnetic modules 12 are disposed on the bottom of the counterweight base 13, and the two first magnetic components 121 are positioned on the adjacent inner sides of the two first magnetic modules 12. Thus, the two first magnetic components 121 are disposed on the adjacent inner sides underneath the two motor coils 14, and the first magnetic poles A of the two first magnetic components 121 correspond to the bottom of the adjacent inner sides of the two motor coils 14. The two second magnetic components 122 of the two first magnetic modules 12 are disposed on the bottom of the counterweight base 13, and the two second magnetic components 122 are positioned on the outer sides of the two first magnetic modules 12 far away from each other. Thus, the two second magnetic components 122 are disposed on the outer sides far away from each other underneath the two motor coils 14, and the second magnetic poles B of the two second magnetic components 122 correspond to the bottom of the outer sides far away from each other underneath the two motor coils 14. Furthermore, as shown in FIG. 4, FIG. 4 is an enlarged view of the left part of the electronic device 1. A vertical line extending downward from the voice coil 19 is used as a boundary, and the motor coil 14 is classified as a left side and a right side based on the boundary, and the left side of the motor coil 14 based on the boundary is denoted as the outer side, and the right side of the motor coil 14 based on the boundary is denoted as the inner side Furthermore, the counterweight base 13 further includes a first groove 131 and a second groove 132. The first groove 131 is located on the bottom of the counterweight base 13, while the second groove 132 is located on the top of the counterweight base 13, and the location of the first groove 131 corresponds to the location of the second groove 132. The number of the first grooves 131 corresponds to the number of the first magnetic modules 12, and the number of the second grooves 132 corresponds to the number of motor coils 14. The structures of the first magnetic component 121 and the second magnetic component 122 are both rectangular parallelepipeds, and the first magnetic component 121 and the second magnetic component 122 are arranged side by side, and the contour of the first groove 131 matches the outer shape of the combined structure of the first magnetic component 121 and the second magnetic component 122. The shape of the motor coil 14 is a flat shape and the structure of the motor coil 14 is similar to a coil winding structure of which is an elliptical structure, and the contour of the second groove 132 matches the contour of the motor coil 14. The second groove 132 is used to secure the motor coil 14, and the motor coil 14 is fixed to the counterweight base 13 with the adhesive. Additionally, the electronic device 1 further includes an electrical module 22, which is disposed on the counterweight base 13 and is fixed on the counterweight base 13 by the adhesive. One end of the electrical module 22 is split into two electrical connecting wires, and these two electrical connecting wires extend to connect to the two motor coils 14. The other end of the electrical module 22 protrudes from the interior of the accommodation groove 111 to the exterior of the housing 11. An external power source is connected to the other end of the electrical module 22 to provide power to the two motor coils 14. The electrical module 22 is a flexible circuit board.

In this embodiment, the electronic device 1 further includes magnetic conductive plates 23, which are disposed on the counterweight base 13 and located on one side of the motor coils 14. The number of the magnetic conductive plates 23 is two, and the two magnetic conductive plates 23 are positioned between the two motor coils 14. The two sides of each magnetic conductive plate 23 correspond to the two sides of the motor coils 14, and the contours on both sides of each magnetic conductive plate 23 match the contours of the inner edges of the motor coils 14. Thus, the magnetic conductive plates 23 can enhance the magnetic field interacting with the motor coils 14. Furthermore, the counterweight base 13 further has two third grooves 133, which are located on the top of the counterweight base 13 and positioned between the two second grooveees132. In other words, the two third grooves 133 are also located between the two motor coils 14. The contour of the third grooves 133 matches the contour of the motor coils 14. The third grooves 133 may be used to secure the magnetic conductive plates 23, which may also be fixed on the lower surface of the supporting plate 15 by the adhesive.

In this embodiment, the supporting plate 15 is located above the motor coils 14 and the electrical module 22, and the supporting plate 15 may be configured to secure the motor coils 14 within the second grooves 132 and to secure the magnetic conductive plates 23 within the third grooves 133. Simultaneously, the supporting plate 15 secures the electrical module 22 to the counterweight base 13. The supporting plate 15 has a major body part 151 and a plurality of connecting parts 152, and the connecting parts 152 are disposed on the peripheral side of the major body part 151, and each of these connecting parts 152 is fixed to the inner wall of the housing 11. The materials of the supporting plate 15 includes non-magnetic metal materials and the plurality of connecting parts 152 of the supporting plate 15 are fixed on the inner wall of the housing 11 by welding. The supporting plate 15 not only is used to provide support to the lower part of the second magnetic module 16 but also is used to secure the top of the counterweight base 13 so that the counterweight base 13 can be limited within the accommodation groove 111 of the housing 11.

As mentioned above, the second magnetic module 16 is disposed on the supporting plate 15 and further includes a major magnetic component 161 and a plurality of minor magnetic components 162. The minor magnetic components 162 are located on one side of the major magnetic component 161. The major magnetic component 161 corresponds to one side above the motor coils 14, while the minor magnetic components 162 correspond to the other side above the motor coils 14. In this embodiment, there are a plurality of minor magnetic components 162, and the plurality of minor magnetic components 162 are located on the peripheral side of the major magnetic component 161. The major magnetic component 161 corresponds to the adjacent inner sides above the two motor coils 14, while the minor magnetic components 162 correspond to the outer sides far away from each other above the two motor coils 14. Additionally, the two sides of the major magnetic component 161 and the two sides of each of the minor magnetic components 162 have a first magnetic pole A and a second magnetic pole B. The second magnetic pole B of the major magnetic component 161 corresponds to the adjacent inner sides of the two motor coils 14, and the first magnetic pole A of each of the plurality of minor magnetic components 162 corresponds to the outer sides of the two motor coils 14 far away from each other.

Figure 7:
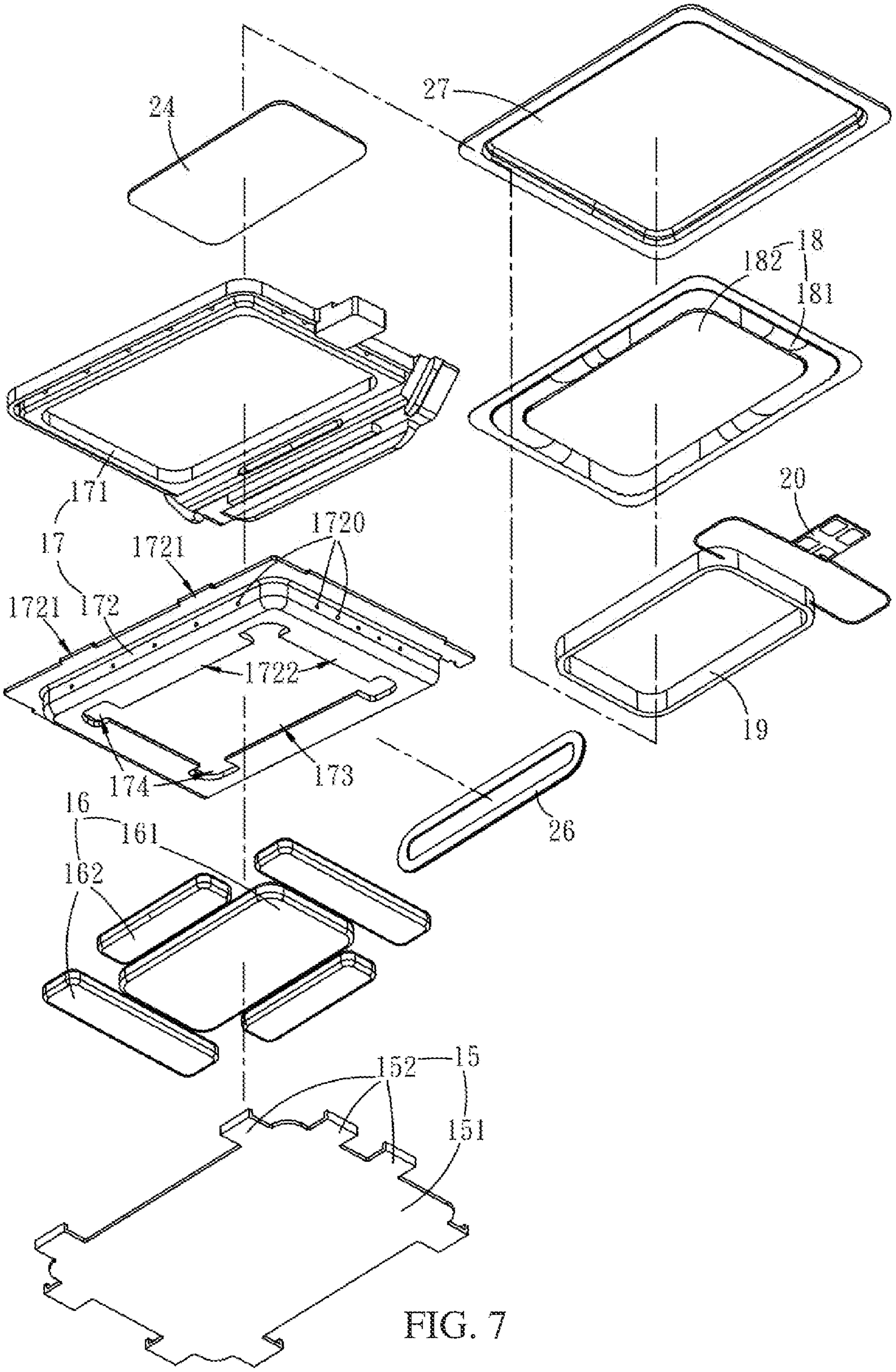
FIG. 7 is an exploded view of the upper part of the electronic device of the present application.
Figure 8:
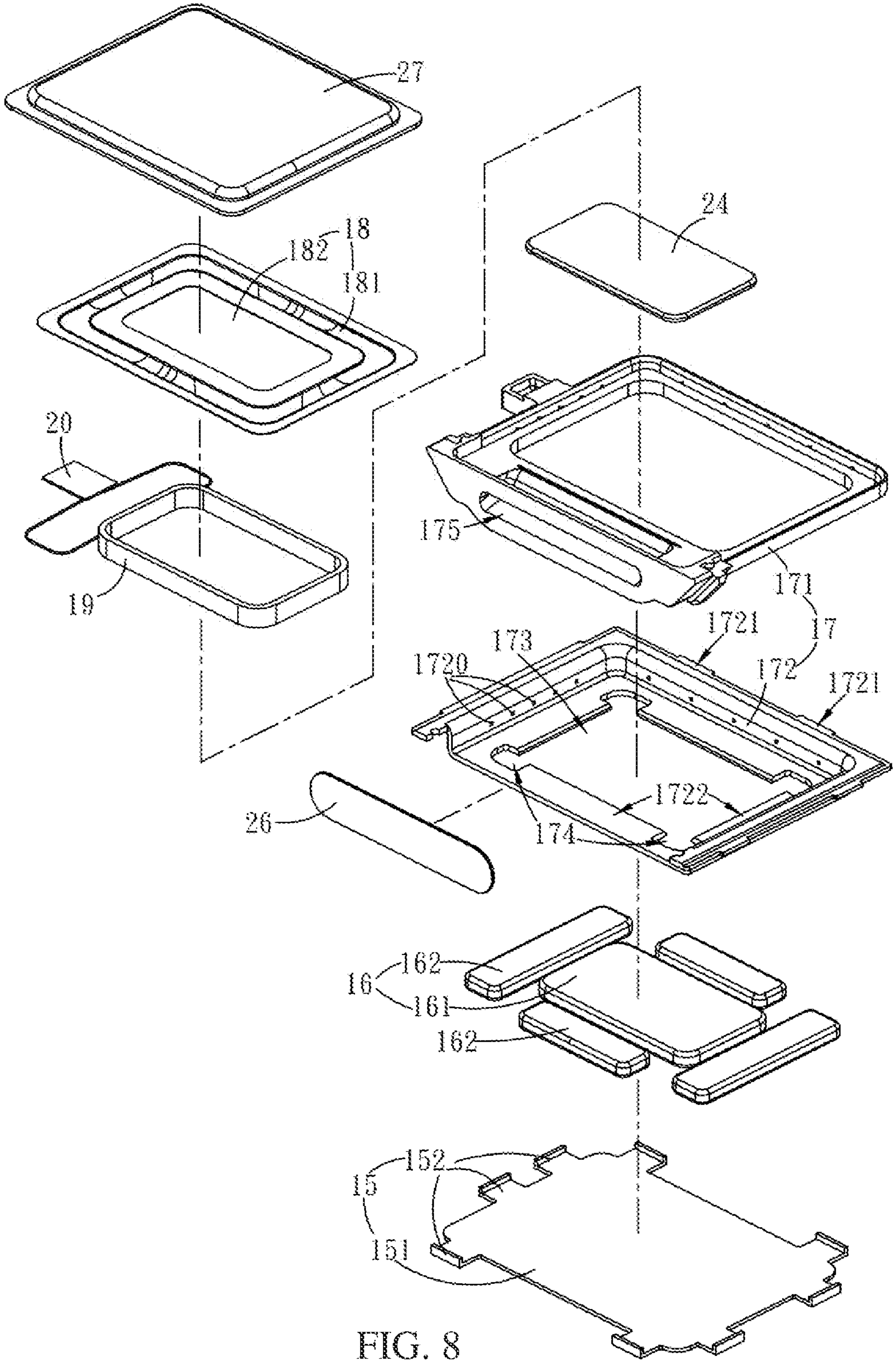
FIG. 8 is an exploded view of another upper part of the electronic device of the present application.

Please refer to FIG. 7 and FIG. 8 together. FIG. 7 is an exploded view of the upper part of the electronic device of the present application, and FIG. 8 is an exploded view of another upper part of the electronic device of the present application. As shown in figures, the second magnetic module 16 is disposed on the supporting plate 15. The bracket module 17 is disposed on the housing 11, and the bracket module 17 is fixed to the opening of the accommodation groove 111. The bracket module 17 has a bracket component 171 and a minor magnetic conductive part component 172. The bracket component 171 is disposed on the minor magnetic conductive component 172, and the materials of the bracket module 17 includes plastic materials. The minor magnetic conductive component172 has a plurality of fixing holes 1720, and the bracket component 171 is fixed to the minor magnetic conductive component 172 by injection molding. The inner part of the bracket component 171 passes through the plurality of fixing holes 1720 of the minor magnetic conductive component 172, and thus, the bracket component 171 is secured to the inner and the outer sides of the minor magnetic conductive component 172. The outer side of the minor magnetic conductive component 172 has a first clamping part 1721, and the inner side of the minor magnetic conductive component 172 has a magnetic conductive part 1722. The housing 11 has a second clamping part 112, which is disposed on the peripheral side of the opening of the accommodation groove 111. The first clamping part 1721 of the bracket component 171 of the bracket module 17 is secured to the second clamping part 112 of the housing 11 (please refer to FIG. 2 again). In this way, the first clamping part 1721 of the bracket component 171 and the second clamping part 112 of the housing 11 may be used to restrict horizontal rotation, and the first clamping part 1721 is fixed to the second clamping part 112 by welding, and thus, the bracket module 17 is fixed on the housing 11.

As above mentioned, the minor magnetic conductive component 172 of the bracket module 17 has an opening 173 corresponding to the major magnetic component 161. The minor magnetic component 162 is positioned on the peripheral side of the opening 173. In the bracket module 17, the magnetic conductive part 1722 of the bracket component 171 is fixed on the minor magnetic component 162. The magnetic conductive part 1722 is helpful to concentrate the magnetic flux lines of the minor magnetic component 162. The voice coil 19 passes through the opening 173 and is located between the major magnetic component 161 and the plurality of minor magnetic components 162. Furthermore, the bracket module 17 has a vent 174, and this vent 174 is positioned on the peripheral side of the opening 173 and is connected to the opening 173. The bracket module 17 divides the accommodation groove 111 into the first audio cavity 1111 and the second audio cavity 1112. The first audio cavity 1111 is located below the bracket module 17 and has the second magnetic module 16. The second audio cavity 1112 is located above the bracket module 17 and has the vibration module 18. Additionally, the opening 173 and the vent 174 of the bracket module 17 connect between the first audio cavity 1111 and the second audio cavity 1112. The voice coil 19 is positioned within the space of both the first audio cavity 1111 and the second audio cavity 1112.

As above mentioned, the electronic device 1 further includes a major magnetic conductive component24, which is positioned inside the opening 173 of the minor magnetic conductive component 172. The major magnetic conductive part 24 is disposed on the major magnetic component 161 and aids in concentrating the magnetic flux lines of the major magnetic component 161. Additionally, the bracket component 171 of the bracket module 17 has an audio outlet 175, and the audio outlet 175 is connected to the second audio cavity 1112 of the accommodation groove 111. Furthermore, the electronic device 1 also comprises a dust-proof cover 26, which is positioned on the audio outlet 175 of the bracket component 171.

In this embodiment, the vibration module 18 is disposed on the bracket module 17. The vibration module 18 comprises a diaphragm 181 and a middle adhesive sheet 182. The bracket module 17 is located on the peripheral side of the diaphragm 181, and the diaphragm 181 may be fixed to the bracket module 17 through integral injection molding or adhesive bonding. The diaphragm 181 is disposed on the peripheral side of the middle adhesive sheet 182, and the diaphragm 181 maybe fixed to the middle adhesive sheet 182 through integral injection molding, adhesive bonding, or PSA (Pressure-Sensitive Adhesive). The voice coil 19 is disposed below the middle adhesive sheet 182 and maybe fixed to the middle adhesive sheet 182 through an adhesive dispensing method, and the voice coil 19 is located on the inner side of the diaphragm 181, and the materials of the middle adhesive sheet 182 include high-strength materials, such as foam. The diaphragm 181 maybe a single-layer or composite material, such as silicone or Peek composite film. The bottom of the voice coil 19 passes through the opening 173 of the bracket module 17 and is positioned between the major magnetic component 161 and the minor magnetic component 162. Simultaneously, the bottom of the voice coil 19 is also positioned between the major magnetic conductive component24 and the minor magnetic conductive component 172.

Additionally, the electronic device 1 further includes a cover plate 27. The cover plate 27 is disposed on the bracket module 17 and covers the vibration module 18. In this way, the cover plate 27 seals the open space above the vibration module 18, so that the sound generated through vibration of the vibration module 18 and the voice coil 19 is concentratedly transmitted to the first audio cavity 1111 and the second audio cavity 1112. After sound resonance occurs within the first audio cavity 1111 and the second audio cavity 1112, the sound is emitted from the audio outlet 175.

Please refer to FIG. 4 to FIG. 6 again. In this embodiment, the structure of the lower part of the electronic device 1 is a motor structure. The electronic device 1 guides power to the two motor coils 14 through the other end of the electrical module 22 to alter the magnetic field of the two motor coils 14. The inner sides beneath the two motor coils 14 correspond to the first magnetic poles A of the two first magnetic components 121, while the outer sides beneath the two motor coils 14 correspond to the second magnetic poles B of the two second magnetic components 122, and thus, the two sets of the first magnetic modules 12 respectively form a complete magnetic field beneath the two motor coils 14. Furthermore, the upper part of the two motor coils 14 belonging to the inner side correspond to the second magnetic pole B of the major magnetic component 161, and the upper part of the two motor coils 14 belonging to the outer side correspond to the first magnetic pole A of the two minor magnetic components 162, and thus, the upper part of the major magnetic component 161 and the plurality of minor magnetic components 162 corresponding to the two motor coils 14 forms a complete upper magnetic field. Furthermore, the motor coils 14 utilize the magnetic conductive component 23 to help the magnetic lines of the magnetic field of the major magnetic component 161 and the minor magnetic component 162 to be concentrated. Moreover, the supporting plate 15 located above the motor coils 14 not only assists in the interaction of the magnetic field of the motor coils 14 but also helps the magnetic lines of the second magnetic module 16 to be concentrated.

In this embodiment, the motor coils 14 change the magnetic field through electrical means, and generate attracting interaction and repelling interaction on the magnetic fields of the surrounding first magnetic modules 12 and the second magnetic module 16. As a result, the motor coils 14 interact with the counterweight base 13 to generate lateral linear displacement which causes the electronic device 1 to generate vibration, and the two elastic modules 21 serves as the buffer structure for the displacement.

Please refer to FIG. 7 and FIG. 8 together. In this embodiment, the structure of the upper part of the electronic device 1 is a speaker structure. The electronic device 1 further includes the conductive component 20 disposed on the bracket module 17, and the voice coil 19 is connected to the conductive component 20, and wherein, the conductive component 20 exposed on the outer surface of the bracket module 17, is connected to the external power source. The electronic device 1 is electrically connected to the voice coil 19 through the external power source, and the voice coil 19 generates the attracting interaction and the repelling interaction by changing the magnetic field relative to the magnetic field of the surrounding second magnetic module 16. The supporting plate 15, located beneath the structure composed of the major magnetic component 161 and the plurality of minor magnetic components 162, may serve as the role which helps the magnetic lines below the supporting plate 15 to be concentrated. Additionally, the major conductive component 24 on the major magnetic component 161 and the plurality of minor conductive components 172 inside the supporting module 17 on the plurality of minor magnetic components 162 may serve as the role which helps the magnetic lines thereon to be concentrated. In this way, through the supporting plate 15, major conductive component 24, and the plurality of minor conductive components 172, the magnetic lines of the second magnetic module 16 maybe concentrated, thereby generating better vibrational effects by the voice coil 19 under the influence of the magnetic field.

In this embodiment, the voice coil 19 changes the magnetic field through electrical means and generates the attracting interaction and the repelling interaction on the magnetic field of the surrounding second magnetic module 16. Consequently, the voice coil 19 interacts with the vibration module 18, so that the sound generated by the upward vibration and the downward vibration of the vibration module 18 is transmitted to the first sound chamber 1111 and the second sound chamber 1112. After the sound undergoes resonance within the first audio cavity 1111 and the second audio cavity 1112, the sound is made through the audio outlet 175.

Figure 9:
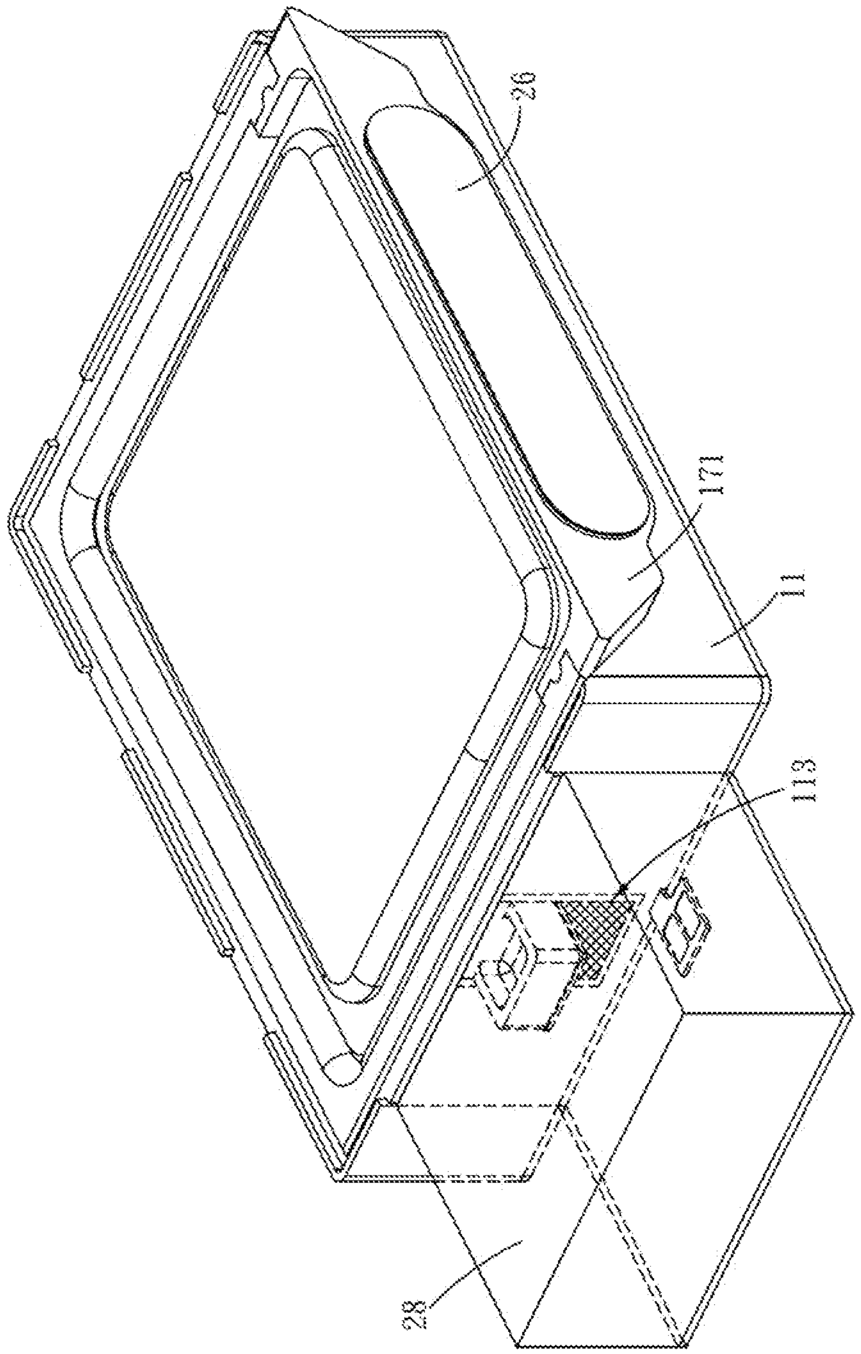
FIG. 9 is a 3D view of the external speaker of the electronic device of the present application.

Please refer to FIG. 9, which is a 3Dview of the external speaker of the electronic device in this application. As shown in the figure, in this embodiment, the electronic device 1 further includes an external speaker 28 disposed on one side of the housing 11. The housing 11 has a sound hole 113 disposed at the position of the housing relative to the external speaker 28. The sound hole 113 is connected to the interior of the first audio cavity 1111 and the external speaker 28, and thus, the tone of the sound within the first audio cavity 1111 and the second audio cavity 1112 is balanced and saturated.

In summary, the present application provides an electronic device that employs the structural design where the voice coil and the motor coil share the second magnetic module to effectively reduce the needed inner space of the electronic device occupied by the combination of the speaker structure and motor structure, thereby increasing the available space of the other components. The available space may be used to enhance the design of the structures of the other components to improve the efficiency of the electronic device. Alternatively, the available space may directly reduce the overall volume of the electronic device, and it is more convenient for storage.

It is to be understood that the term "comprises", "comprising", or any other variants thereof, is intended to encompass a non-exclusive inclusion, such that a process, method, article, or device of a series of elements not only include those elements but also comprises other elements that are not explicitly listed, or elements that are inherent to such a process, method, article, or device. An element defined by the phrase "comprising a . . . " does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. An electronic device comprising:

a housing having an accommodation groove;

a first magnetic module disposed in the accommodation groove;

a counterweight base disposed on the first magnetic module;

a motor coil disposed on the counterweight base and disposed correspondingly to the first magnetic module, wherein the first magnetic module is configured to interact with the motor coil;

a supporting plate disposed on the motor coil;

a second magnetic module disposed on the supporting plate, wherein the second magnetic module is correspondingly disposed to the motor coil, and the second magnetic module is configured to interact with the motor coil;

a bracket module disposed in the housing and on the second magnetic module, wherein the bracket module divides the accommodation groove into a first audio cavity and a second audio cavity, and the second magnetic module is disposed in the first audio cavity, the bracket module has an opening and a vent, the vent is disposed around the opening and connected to the opening, the opening and the vent of the bracket module are connected between the first audio cavity and the second audio cavity;

a vibration module disposed on the bracket module; and a voice coil disposed under the vibration module and passing through the bracket module, wherein the voice coil is located inside the second magnetic module.

2. The electronic device as claimed in claim 1, further comprising two elastic modules disposed on two sides of the counterweight base respectively, wherein two ends of each of the elastic modules contact the housing and the counterweight base respectively.

3. The electronic device as claimed in claim 1, wherein the counterweight base further comprises a first groove disposed on a bottom of the counterweight base and a second groove disposed on a top of the counterweight base, the first magnetic module is disposed in the first groove, and the motor coil is disposed in the second groove.

4. The electronic device as claimed in claim 1, wherein the second magnetic module further comprises a major magnetic component and a minor magnetic component disposed on one side of the major magnetic component, the major magnetic component corresponds to one side above the motor coil, and the minor magnetic component corresponds to the other side above the motor coil.

5. The electronic device as claimed in claim 4, wherein the first magnetic module comprises a first magnetic component and a second magnetic component, the first magnetic component corresponds to one side below the motor coil, and the second magnetic component corresponds to the other side below the motor coil.

6. The electronic device as claimed in claim 4, wherein the bracket module has a bracket component and a minor magnetic conductive component where the bracket component is disposed, materials of the bracket component comprises plastics materials and the bracket component has an inner part, the minor magnetic conductive component has a plurality of fixing holes, the bracket component is fixed on the minor magnetic conductive component by plastic injection molding, the inner part of the bracket component passes through the plurality of fixing holes of the minor magnetic conductive component, the opening corresponds to the major magnetic component, the plurality of minor magnetic components are disposed outside the opening, the bracket component is fixed on the plurality of minor magnetic components, the voice coil passes through the opening and is disposed between the major magnetic component and the plurality of minor magnetic components.

7. The electronic device as claimed in claim 6, wherein the bracket component of the bracket module has an audio outlet connected to the second audio cavity.

8. The electronic device as claimed in claim 7, further comprising a dust-proof cover disposed on the audio outlet of the bracket module.

9. The electronic device as claimed in claim 6, wherein an inner side of the minor magnetic conductive component has a magnetic conductive part fixed on the corresponding minor magnetic component and an outer side of the minor magnetic conductive component has a first clamping part, the housing has a second clamping part disposed on a peripheral side of the accommodation groove, and the first clamping part is fixed on the second clamping part.

10. The electronic device as claimed in claim 4, further comprising a major magnetic conductive component disposed on the major magnetic component.

11. The electronic device as claimed in claim 1, further comprising a magnetic conductive plate disposed on the counterweight base, and the magnetic conductive plate is disposed under the supporting plate and located on one side of the motor coil.

12. The electronic device as claimed in claim 11, wherein the counterweight base further includes a third groove disposed on a top of the counterweight base, and the third groove is located on one side of the motor coil, and the magnetic conductive component is located in the third groove.

13. The electronic device as claimed in claim 1, wherein the supporting plate has a major body part and a plurality of connecting parts disposed on a peripheral side of the major body part, and the plurality of connecting parts are fixed on an inner wall of the housing respectively.

14. The electronic device as claimed in claim 1, wherein the vibration module includes a diaphragm and a middle adhesive sheet, the bracket module is disposed on a peripheral side of the diaphragm, and the diaphragm is disposed on a peripheral side of the middle adhesive sheet, the voice coil is disposed under the middle adhesive sheet and is located inside the diaphragm.

15. The electronic device as claimed in claim 1, further comprising an electrical module disposed on the counterweight base, wherein one end of the electrical module is electrically connected to the motor coil, and the other end of the electrical module extends from the accommodation groove to the outside of the housing.

* * * * *